(12) United States Patent
Ikeyoshi (10) Patent No.: US 11,001,302 B2
(45) Date of Patent: May 11, 2021

(54) REAR PORTION STRUCTURE OF VEHICLE (71) Applicant: Toyota Jidosha Kabushiki Kaisha, Toyota (JP)

(72) Inventor: Maiko Ikeyoshi, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 92 days.

(21) Appl. No.: 16/560,061

(22) Filed: Sep. 4, 2019

(65) Prior Publication Data

US 2020/0079430 A1 Mar. 12, 2020

(30) Foreign Application Priority Data

Sep. 10, 2018 (JP) .............................. JP2018-169003

(51) Int. Cl.
*B62D 21/03* (2006.01)
(52) U.S. Cl.
CPC .................................... *B62D 21/03* (2013.01)
(58) Field of Classification Search
CPC ...................................................... B62D 21/03
See application file for complete search history.

(56) References Cited

U.S. PATENT DOCUMENTS 9,855,906 B2\* 1/2018 Garnweidner .......... B60R 19/48
2009/0236877 A1\* 9/2009 Peschansky ............ B62D 21/02
296/203.01

FOREIGN PATENT DOCUMENTS

JP 2007-055350 A 3/2007

\* cited by examiner

*Primary Examiner* — Lori L Lyjak
(74) *Attorney, Agent, or Firm* — Dinsmore & Shohl LLP (57) ABSTRACT

A front end of an upper bracket in a vehicle longitudinal direction is welded to a top surface of a rear cross member, and a weld zone between the rear cross member and the upper bracket includes, in a plan view of a vehicle, a central portion extending along a vehicle width direction and a curved end portion extending in a curved shape from each end of the central portion in the vehicle width direction toward a front side of the vehicle or a diagonally front side of the vehicle, to thereby reduce a stress on each vehicle-widthwise end of the weld zone between the rear cross member and the upper bracket configured to connect a towing tool attachment to the rear cross member.

4 Claims, 14 Drawing Sheets

REAR PORTION STRUCTURE OF VEHICLE

CROSS REFERENCE TO RELATED APPLICATION

This application claims priority to Japanese Patent Application No. 2018-169003 filed on Sep. 10, 2018, which is incorporated herein by reference in its entirety including the specification, claims, drawings, and abstract.

TECHNICAL FIELD

The present disclosure relates to a rear portion structure of a vehicle, and in particular, relates to a weld zone for welding a rear cross member and a bracket configured to connect a towing tool attachment to the rear cross member.

BACKGROUND

For example, JP 2007-055350 A discloses a rear portion structure of a vehicle, in which a bracket for connecting a towing tool attachment is joined to a central portion, in a vehicle width direction, of a rear cross member which is disposed on a rear end region of the vehicle in a vehicle longitudinal direction and arranged to extend along a vehicle width direction.

When the bracket for connecting the towing tool attachment to the rear cross member is joined to the rear cross member by welding the bracket along the vehicle width direction to the rear cross member, stress is concentrated on both ends of a weld zone in the vehicle width direction, which may cause a fatigue failure of the weld zone with the both ends serving as a starting point of the fatigue failure.

Under the circumstances, an object of the present disclosure is to reduce stress on both ends, in a vehicle width direction, of a weld zone between a rear cross member and a bracket for connecting a towing tool attachment to the rear cross member, to thereby prevent a fatigue failure of the weld zone.

SUMMARY

A rear portion structure of a vehicle according to the present disclosure includes a rear cross member which is disposed on a rear end region of the vehicle in a vehicle longitudinal direction and arranged to extend along a vehicle width direction, a towing tool attachment which is disposed on a central portion of the rear cross member in the vehicle width direction and configured to fix a towing tool used for allowing the vehicle to tow a towed object, and a bracket which connects the towing tool attachment to the rear cross member, in which a front end of the bracket in the vehicle longitudinal direction is welded to either a top surface or a bottom surface of the rear cross member, and in a plan view of the vehicle, a weld zone between the rear cross member and the bracket includes a central portion extending along the vehicle width direction and a curved end portion extending in a curved shape from each vehicle-widthwise end of the central portion toward a front region or a diagonally front region of the vehicle.

When the weld zone between the rear cross member and the bracket has the curved end portion extending in a curved shape from each end of the central portion of the weld zone toward the front region or the diagonally front region of the vehicle, surface stiffness of the weld zone is increased in the curved end portion, which contributes to a reduction in stress acting on each end of the weld zone in the vehicle width direction. As a result, a fatigue failure of the weld zone can be prevented.

In an aspect of the rear portion structure of a vehicle according to this disclosure, a vehicle-widthwise outer side of the curved end portion of the weld zone may be in contact with the bracket.

According to this aspect, because the vehicle-widthwise outer side of the curved portion of the weld zone between the rear cross member and the bracket makes contact with the bracket, the weld zone does not form any angle with the bracket at an interface between the weld zone on the vehicle-widthwise outer side of the curved portion and the bracket, which can contribute to a reduction in stress on the interface.

In an aspect of the rear portion structure of a vehicle according to this disclosure, the bracket may be an upper bracket whose front end in the vehicle longitudinal direction is welded to the top surface of the rear cross member, a lower bracket configured to connect the towing tool attachment to the rear cross member may be further provided, the lower bracket whose front end in the vehicle longitudinal direction is welded to the bottom surface of the rear cross member, and a weld zone between the rear cross member and the lower bracket may be formed to extend linearly along the vehicle width direction.

According to this aspect, because the weld zone between the rear cross member and the lower bracket is linearly extended in a simple shape along the vehicle width direction, there can be prevented an increase in manufacturing costs due to a complex shape of the weld zone.

The present disclosure provides an advantageous effect of reducing stress acting on each vehicle-widthwise end of the weld zone between the rear cross member and the bracket for connecting the towing tool attachment to the rear cross member, and accordingly preventing a fatigue failure of the weld zone.

BRIEF DESCRIPTION OF DRAWINGS

An embodiment of the present disclosure will be described based on the following figures, wherein.

DESCRIPTION OF EMBODIMENT

Figure 1:
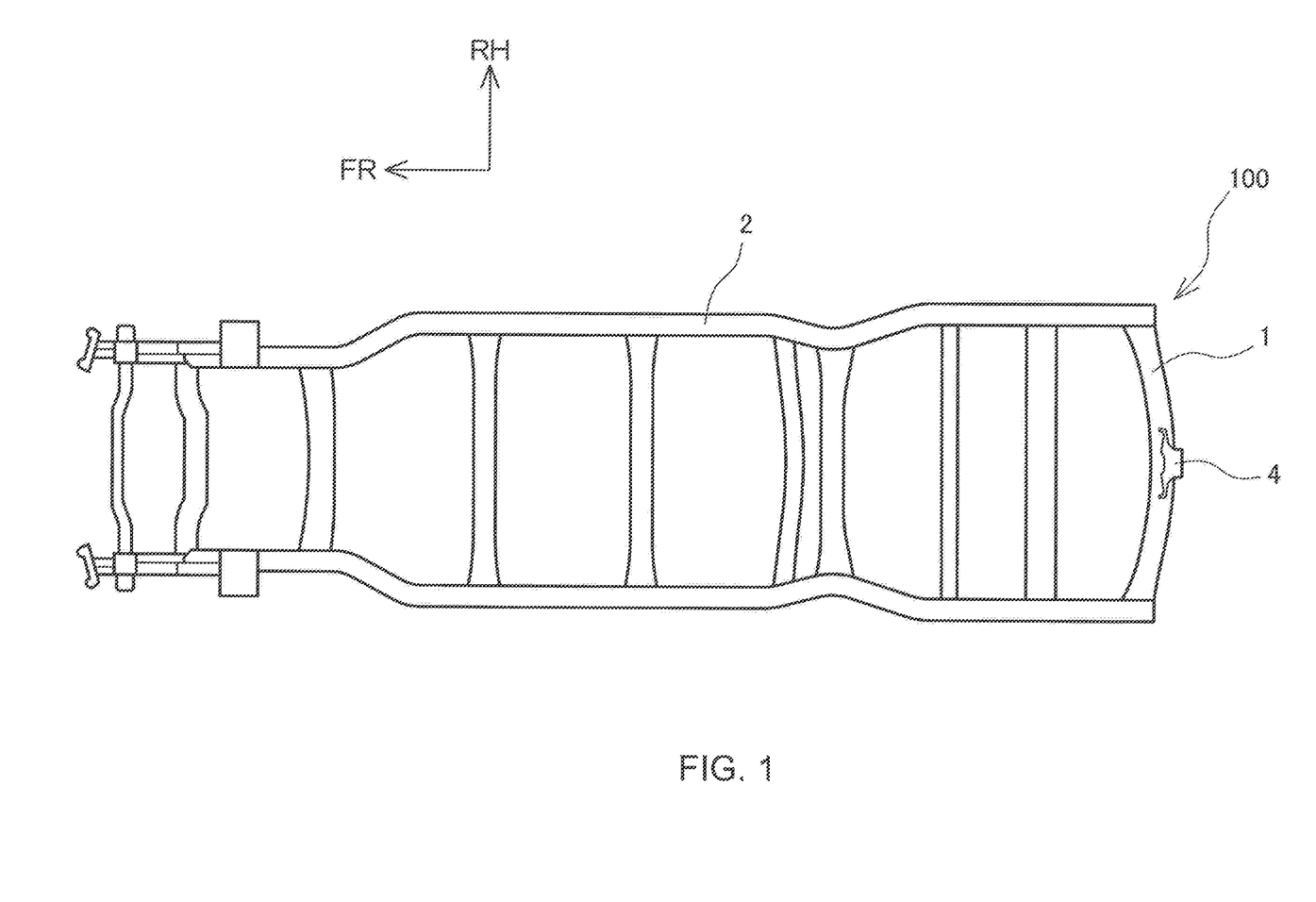
FIG. 1 is a plan view of an overall chassis frame including a vehicle rear portion structure according to an embodiment.
Figure 2:
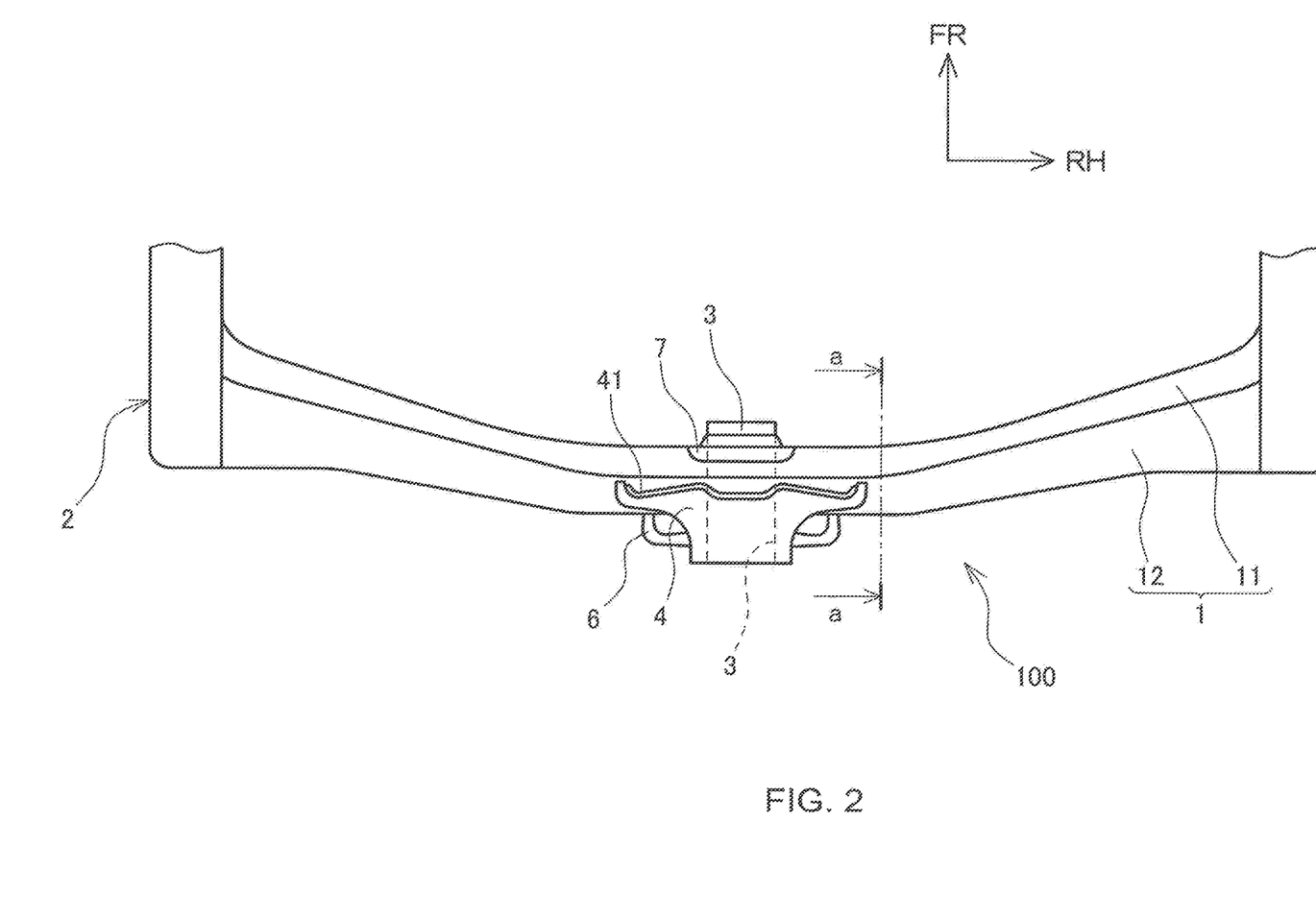
FIG. 2 is a plan view of the vehicle rear portion structure according to the embodiment.

Hereinafter, a rear portion structure 100 of a vehicle according to an embodiment will be explained with reference to the drawings. As shown in FIGS. 1 and 2, the rear portion structure 100 of a vehicle includes a rear cross member 1, a towing tool attachment 3, and an upper bracket 4. In the drawings referred to in the following description, arrows identified by reference signs FR, UP, and RH represent a front direction (a travel direction), an upper direction, and a right direction of the vehicle, respectively. Further, directions opposite to the front, upper, and right directions identified with the arrows FR, UP, and RH are a rear direction, a lower direction, and a left direction of the vehicle. In the following description, unless otherwise specified, simple expressions of front and rear, right and left, and above and below denote front and rear in a vehicle longitudinal direction, right and left in a vehicle lateral direction (vehicle width direction), and above and below in a vehicle vertical direction.

Figure 3:
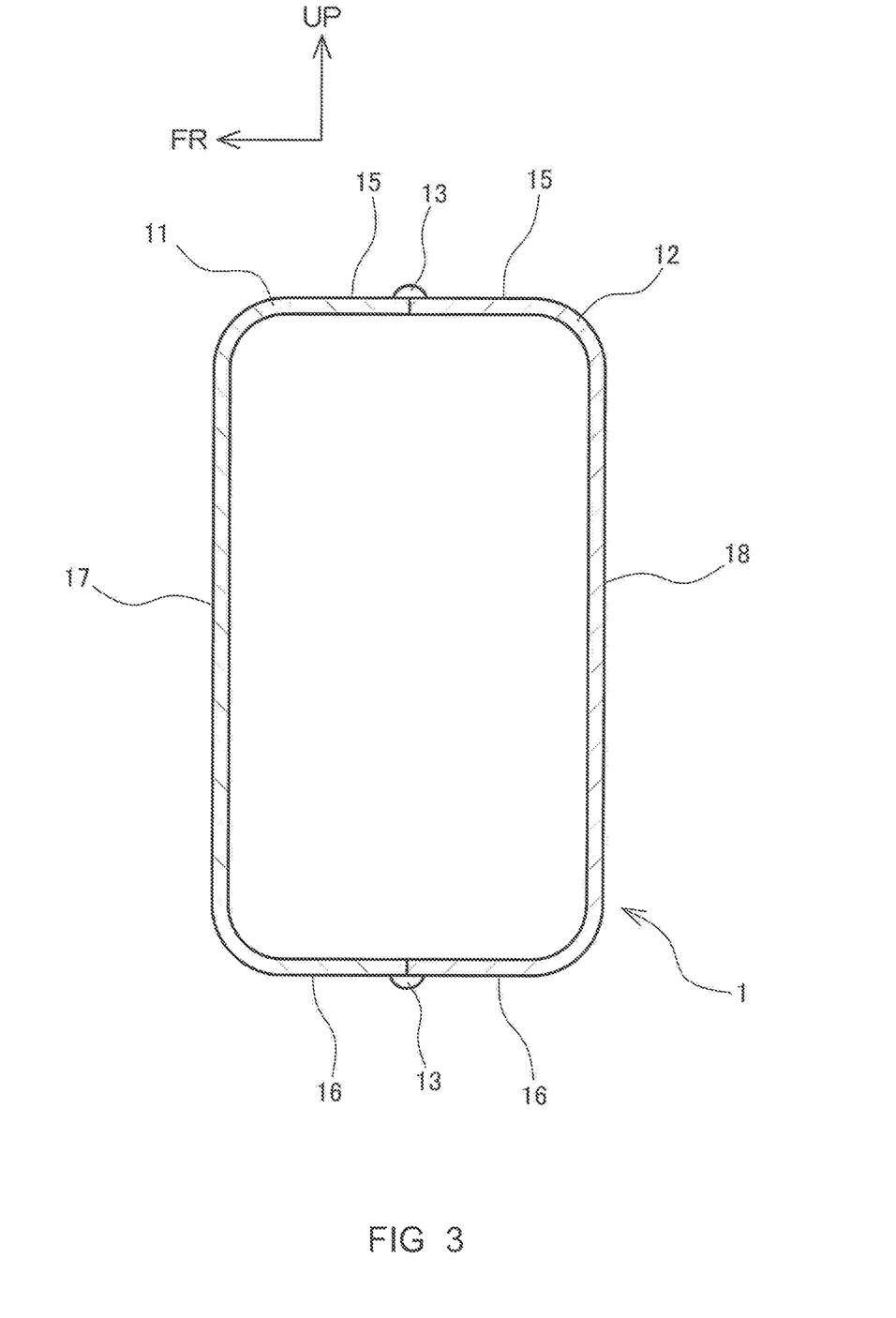
FIG. 3 is a cross section view taken along a line a-a indicated in FIG. 2.

As shown in FIG. 1, the rear cross member 1 is disposed on a rear end of a chassis frame 2 in the vehicle longitudinal direction, and extended along the vehicle width direction. As shown in FIG. 3, the rear cross member 1 has a closed shape in cross section that is formed by joining a rear cross member outer panel 11 and a rear cross member inner panel 12 having U-letter shapes in cross section. The rear cross member outer panel 11 and the rear cross member inner panel 12 are welded to each other in a weld zone 13 to constitute the rear cross member 1. A top surface 15 is formed on the top of the rear cross member 1 in the vehicle vertical direction, and a bottom surface 16 is formed on the bottom of the rear cross member 1. Further, in the vehicle longitudinal direction, a front surface 17 is formed on the front of the rear cross member 1, and a rear surface 18 is formed on the rear of the rear cross member 1.

Figure 4:
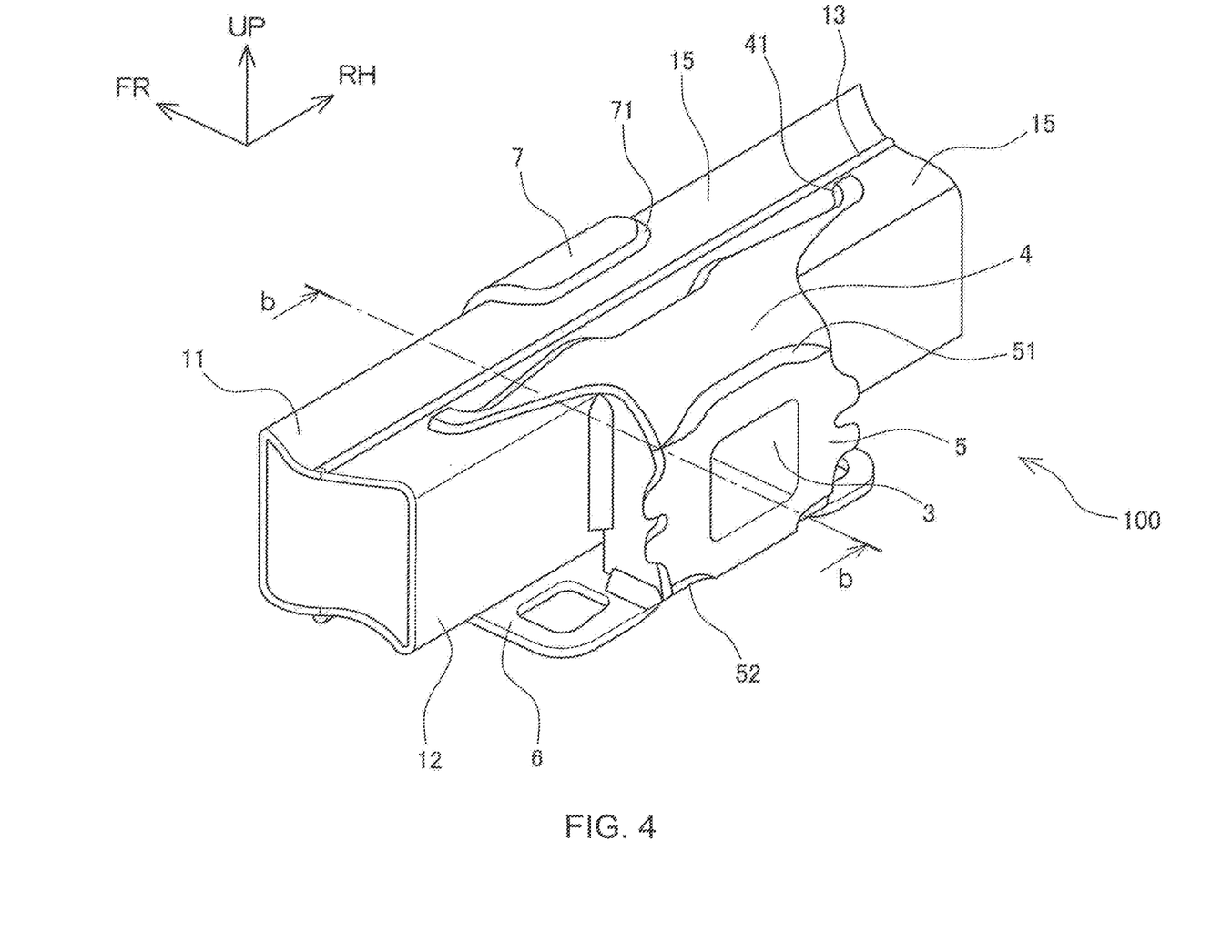
FIG. 4 is a perspective view showing a towing tool attachment and a bracket for connecting the towing tool attachment to a rear cross member.
Figure 5:
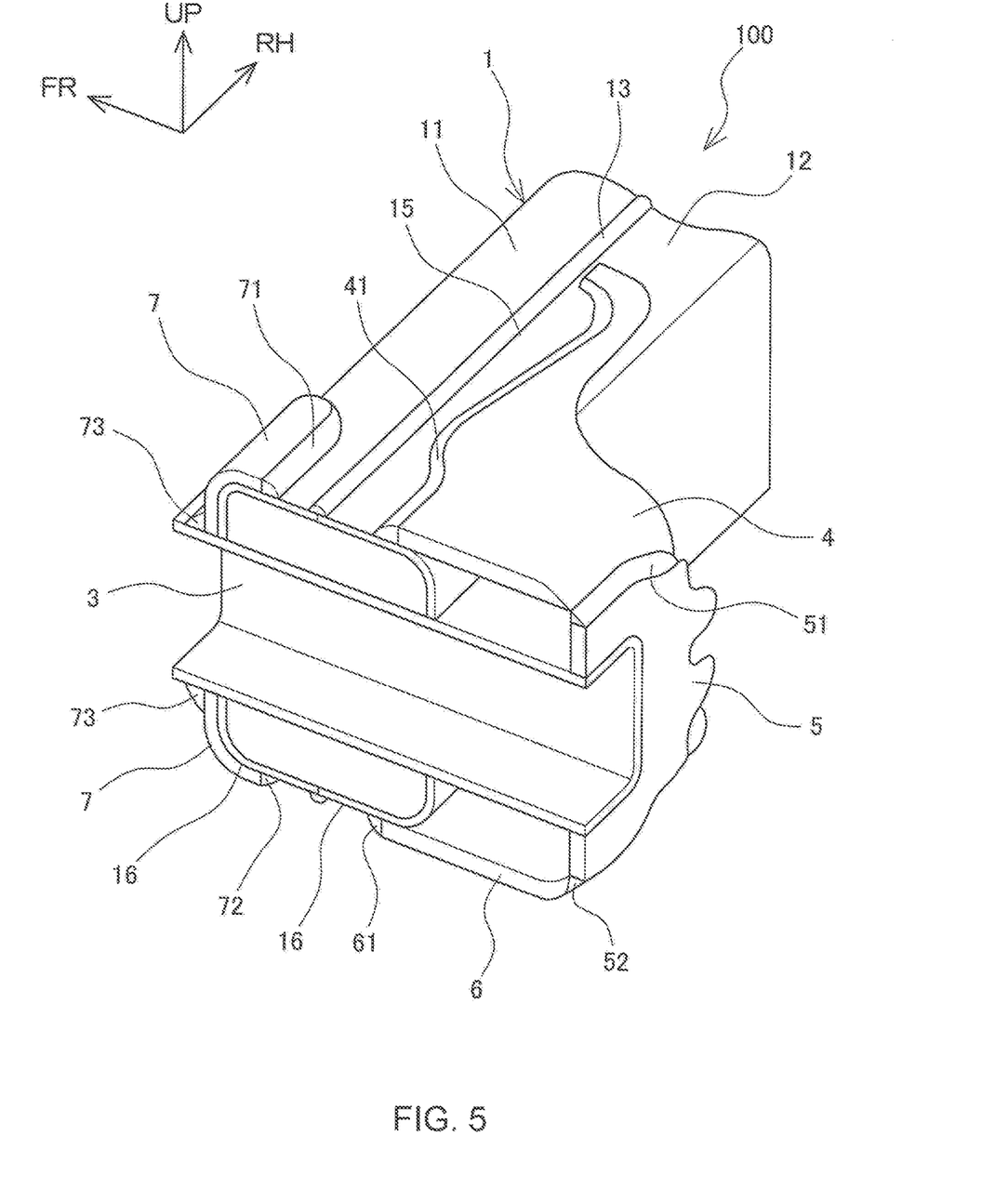
FIG. 5 is a perspective view showing a cross section taken along a line b-b indicated in FIG. 4.

The towing tool attachment 3 used for fixing a towing tool when a not-illustrated vehicle is configured to tow a towed object, such as a trailer, is disposed, as shown in FIG. 2, on a central portion of the rear cross member 1 in the vehicle width direction. As shown in FIGS. 2, 4, and 5, the towing tool attachment 3 is a square cylinder member which is inserted along the vehicle longitudinal direction through a hole defined in the central portion of the rear cross member 1 in the vehicle width direction. The towing tool attachment 3 is joined to the rear cross member 1 by an upper bracket 4, a rear bracket 5, a lower bracket 6, and a front bracket 7. The upper bracket 4 is welded to the rear bracket 5 by a weld zone 51, and the lower bracket 6 is welded to the rear bracket 5 by a weld zone 52. Then, the front bracket 7 is welded to the top surface 15 of the rear cross member 1 by a weld zone 71, and is also welded to the bottom surface 16 of the rear cross member 1 by a weld zone 72. A hole through which the towing tool attachment 3 is inserted is defined in the rear bracket 5, and the upper bracket 4 and the lower bracket 6 are welded to the rear bracket 5. Then, the towing tool attachment 3 is inserted through the hole defined in the rear bracket 5 and welded to the rear bracket 5. Following this, a front end portion of the towing tool attachment 3 is inserted through both the hole defined in the rear cross member 1 and a hole defined in the front bracket 7, and the towing tool attachment 3 is welded to the front bracket 7 by a weld zone 73. Then, a front end of the upper bracket 4 in the vehicle longitudinal direction is welded to the top surface 15 of the rear cross member 1 by a weld zone 41. In addition, a front end of the lower bracket 6 in the vehicle longitudinal direction is welded to the bottom surface 16 of the rear cross member 1 by a weld zone 61. In this way, the towing tool attachment 3 is joined to the rear cross member 1 through the above-described weld zones.

Figure 6:
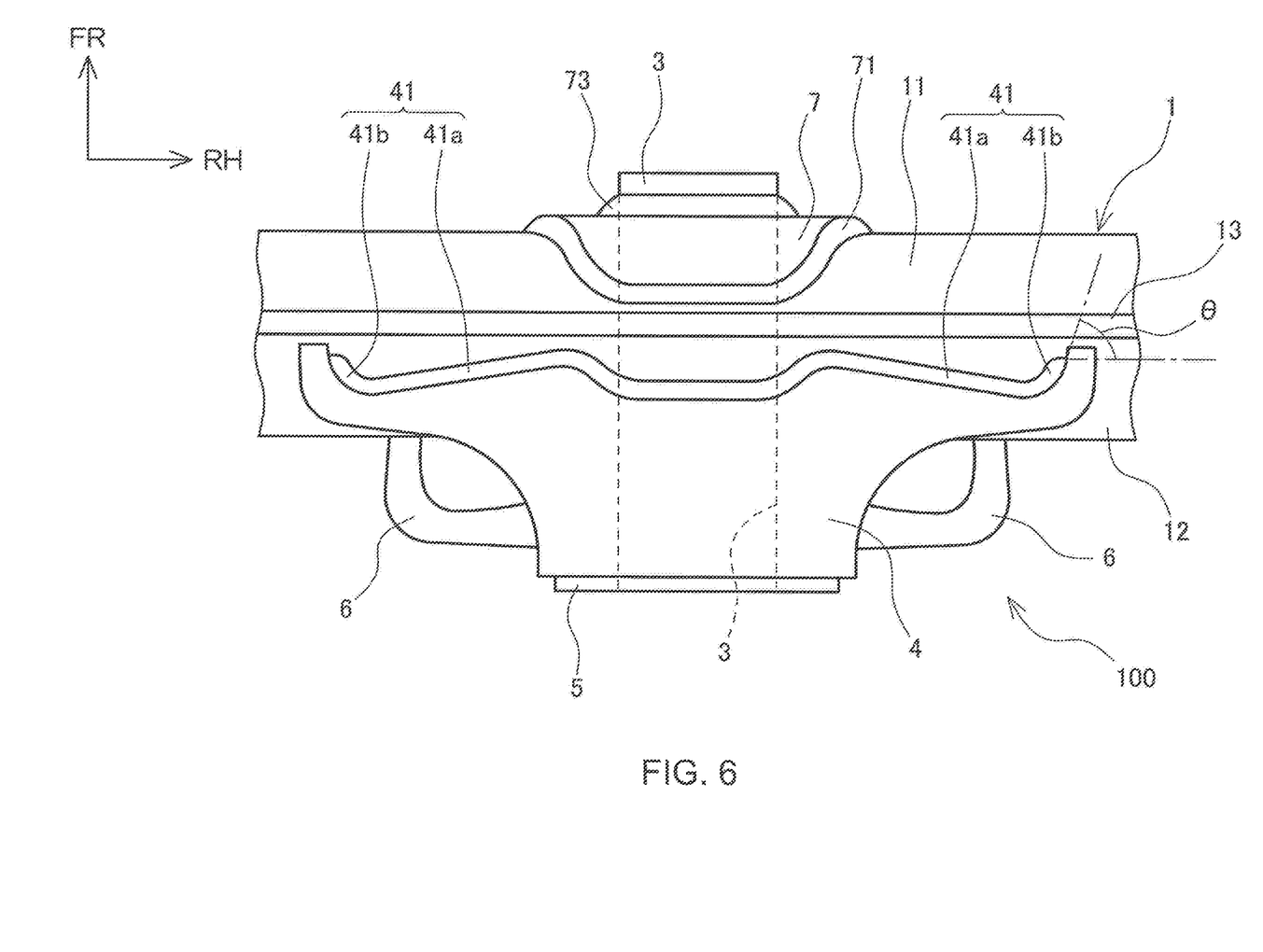
FIG. 6 is a plan view showing a weld zone between an upper bracket and the rear cross member.

As shown in FIG. 6, the weld zone 41 for welding the upper bracket 4 to the rear cross member 1 consists of a central portion 41a extending along the vehicle width direction in a plan view of the vehicle, and curved end portions 41b extending in a curved shape from either end of the central portion 41a in the vehicle width direction toward a diagonal front side of the vehicle. Further, in the plan view of the vehicle, each vehicle-widthwise outer end of the curved end portions 41b extends so as to form an angle θ with respect to a line parallel to the vehicle width direction.

Figure 7:
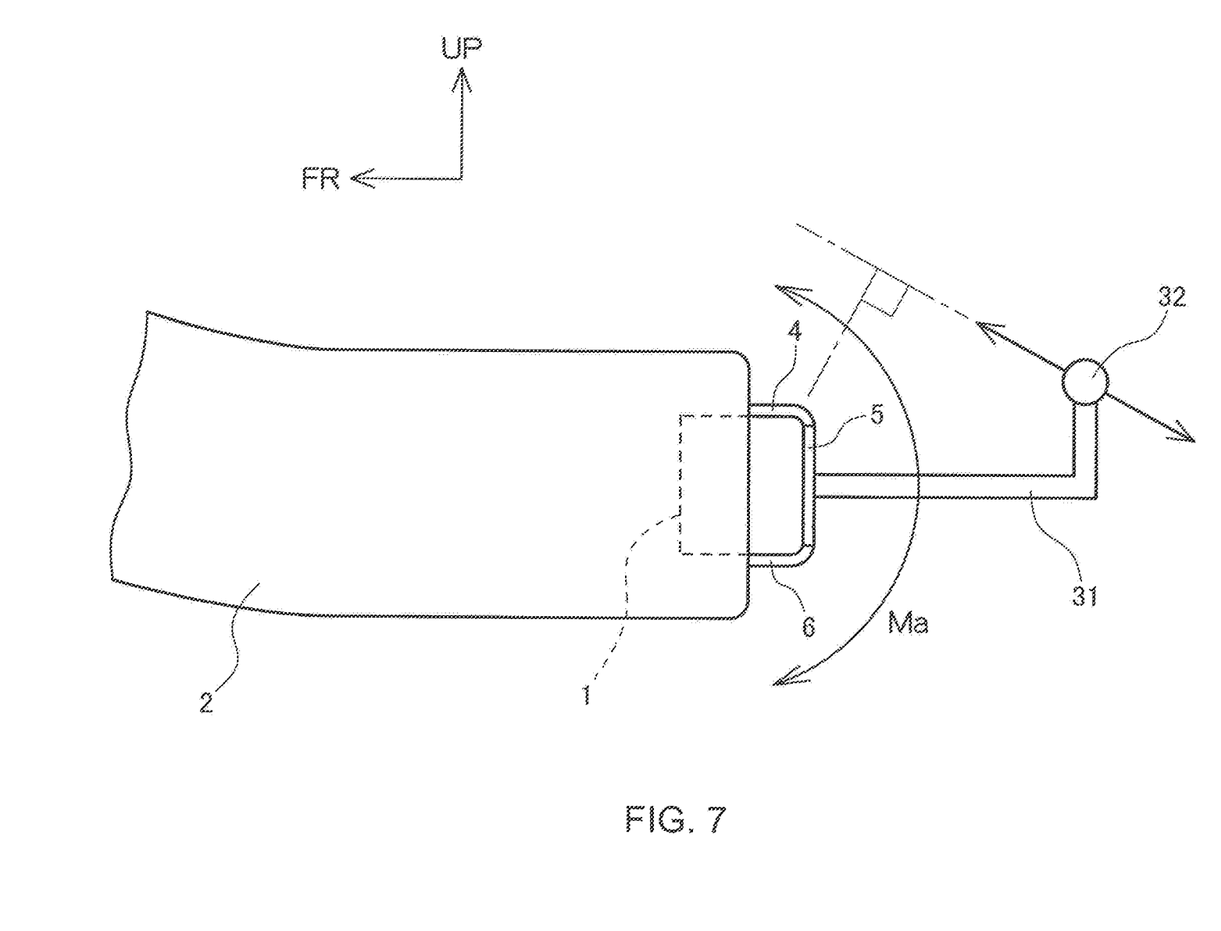
FIG. 7 is a side view showing a rear end portion of the chassis frame in a state where a towing tool is attached.
Figure 8:
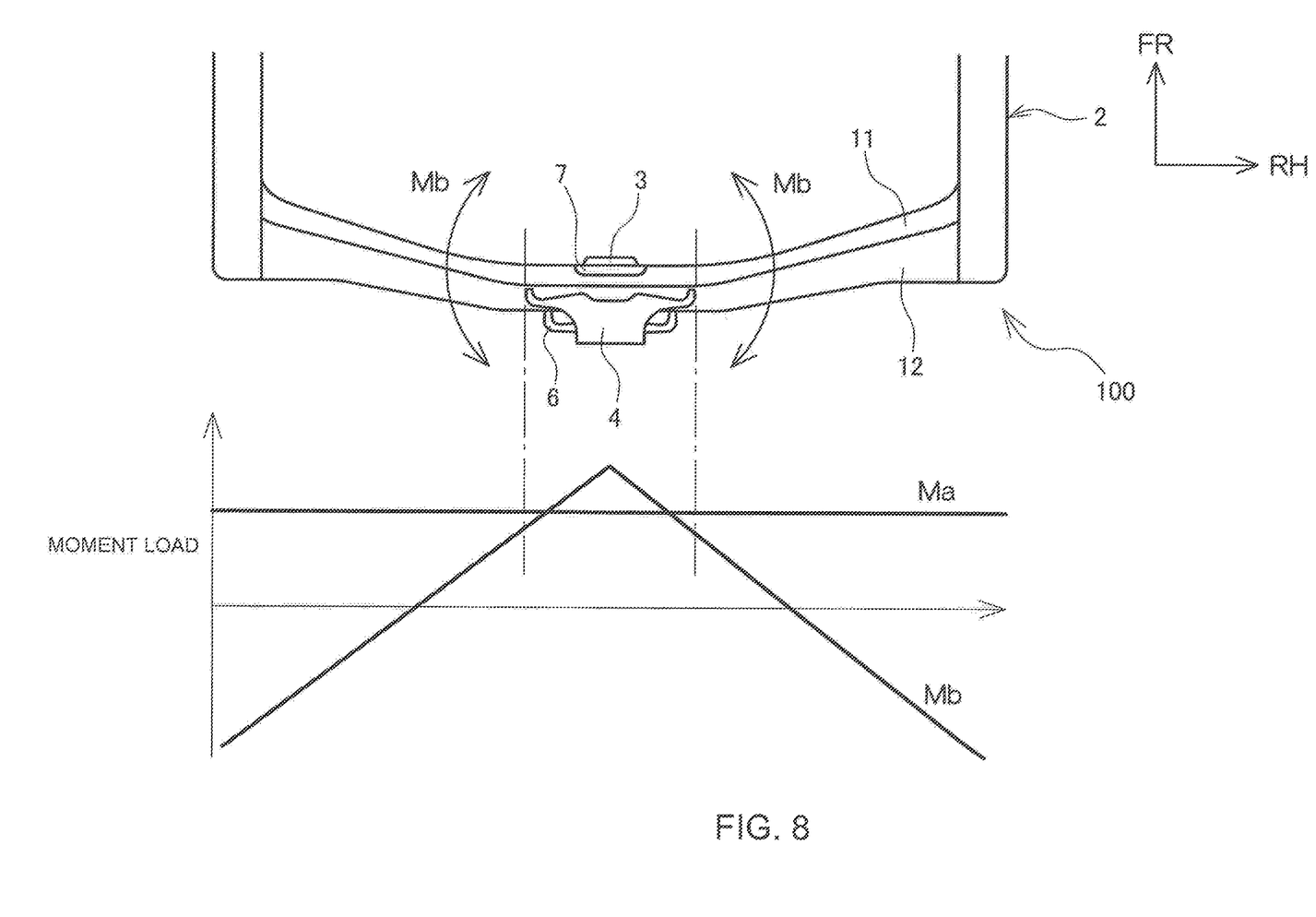
FIG. 8 is a diagram showing moment loads exerted on the rear cross member and a moment distribution.

Next, the reason for a higher stress acting on the weld zone 41 will be described. A towing tool 31 is inserted through a cylinder constituting the towing tool attachment 3 and fixed to the towing tool attachment 3. When the vehicle tows a not-illustrated towed object by the towing tool 31 fixed to the towing tool attachment 3, as shown in FIG. 7, a force is exerted on a hitch ball 32 in a direction toward the rear side of the vehicle during acceleration of the vehicle, whereas a force is exerted on the hitch ball 32 in a direction toward the front side of the vehicle during deceleration of the vehicle. The forces act on the rear cross member 1 as a moment load Ma about a lateral axis along the vehicle width direction. When the vehicle is turned to right or left during its travel in a state of towing the towed object, a moment load Mb about a vertical axis along the vehicle vertical direction is applied to the rear cross member 1 as illustrated in an upper half of the diagram shown in FIG. 8. A lower half of the diagram in FIG. 8 shows a graph representing distributions of the moment load Ma about the lateral axis along the vehicle width direction and the moment load Mb about the vertical axis along the vehicle vertical direction. As is evident from the lower half of FIG. 8, the curved end portion 41b of the weld zone 41 for the upper bracket 4 receives an input of a greater moment.

Directions of principal stresses acting on the surfaces of the rear cross member 1 due to the moment load Ma about the vehicle lateral axis are uniformly inclined at 45 degrees relative to the lateral axis along the vehicle width direction on all of the top surface 15, the bottom surface 16, the front surface 17, and the rear surface 18 of the rear cross member 1. On the other hand, regarding principal stresses acting on the surfaces of the rear cross member 1 due to the moment load Mb about the vertical axis along the vehicle vertical direction, greater principal stresses act on the front surface 17 and the rear surface 18 along the lateral axis, while smaller principal stresses act on the top surface 15 and the bottom surface 16 in regions close to the center thereof in the vehicle longitudinal direction. Therefore, in terms of a combination of the moment load Ma about the lateral axis and the moment load Mb about the vertical axis, the principal stresses on the top surface 15 of the rear cross member 1 are mainly composed of principal stresses resulting from the moment load Ma about the lateral axis in the regions close to the center in the vehicle longitudinal direction.

Figure 9:
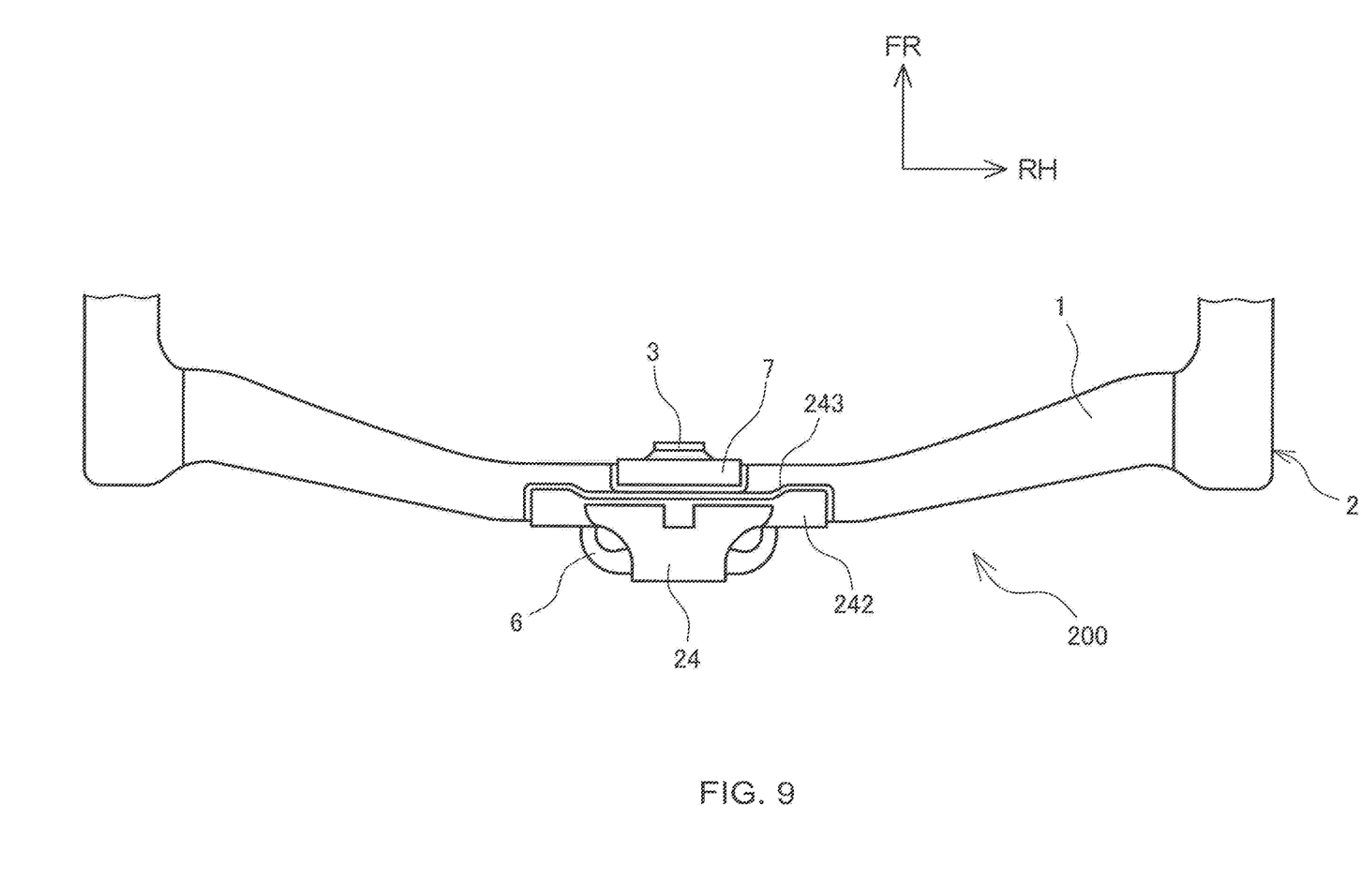
FIG. 9 is a plan view showing an upper bracket and a reinforcement member in a vehicle rear portion structure according to a comparative example.

Next, the reason for stress concentration on both ends of the weld zone will be explained with reference to an upper bracket 24 in a vehicle rear portion structure 200 according to a comparative example shown in FIG. 9. In the vehicle rear portion structure 200 according to the comparative example, a reinforcement member 242 formed of a thick plate is additionally attached to a surface of the rear cross member 1. A weld zone 243 for welding the reinforcement member 242 to the rear cross member 1 is formed as a continuous weld zone which surrounds the entire perimeter of the reinforcement member 242.

Figure 10:
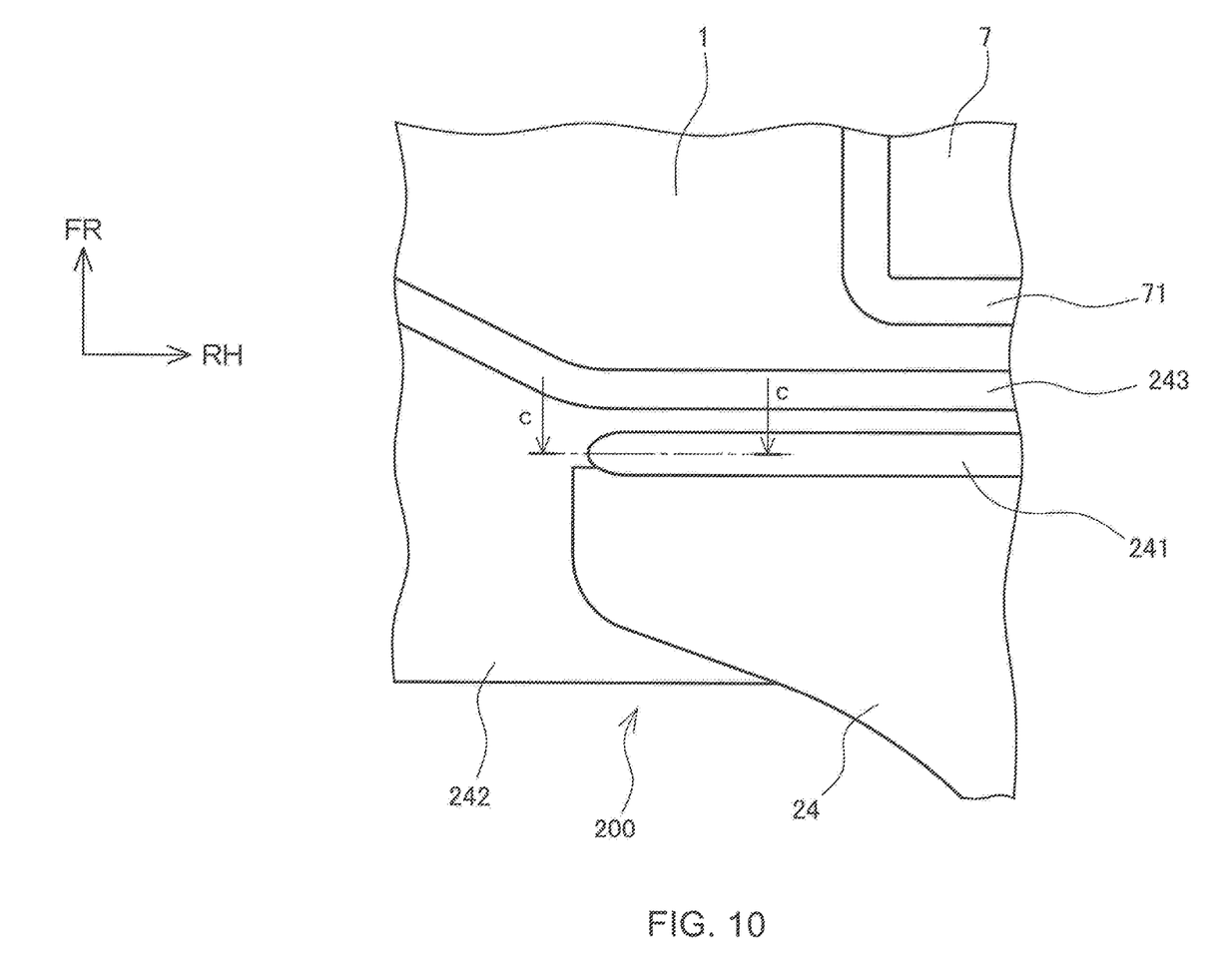
FIG. 10 is a plan view showing an end portion of a weld zone between the upper bracket and the reinforcement member according to the comparative example.
Figure 11:
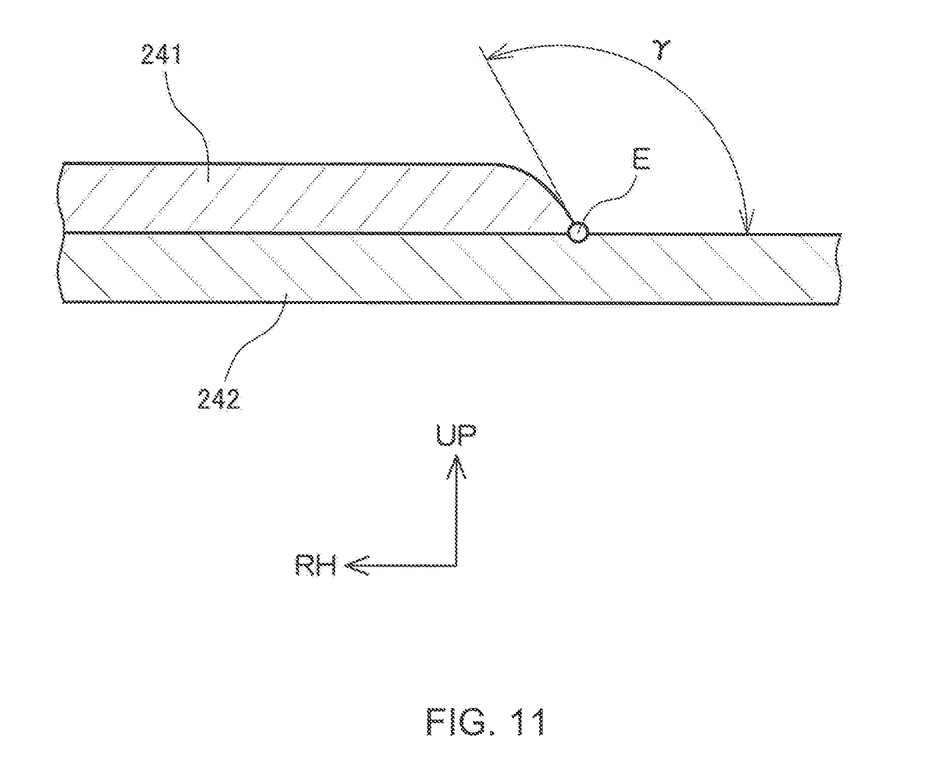
FIG. 11 is a cross section view taken along a line c-c indicated in FIG. 10.

In the vehicle rear portion structure 200 of the comparative example, the upper bracket 24 is welded to the reinforcement member 242, and a weld zone 241 between the upper bracket 24 and the reinforcement member 242 is extended along the vehicle width direction. For this reason, the weld zone 241 has a lower degree of surface stiffness resisting against the principal stresses resulting from the moment load Ma about the lateral axis along the vehicle width direction, and accordingly tends to undergo a greater stress. In addition, as shown in FIG. 10, a weld bead is created on the weld zone 241, and an outer end of the weld zone 241 in the vehicle width direction has a curved contour in the shape of a semicircle in the plan view. As shown in FIG. 11, the vehicle widthwise outer end of the weld zone 241 forms, with the reinforcement member 242, an angle γ having a vertex at a border E between the reinforcement member 242 and the weld zone 241. Because the presence of the angle γ formed by the reinforcement member 242 and the weld zone 241 causes the stress to be concentrated on the border E, the stress on the border E becomes greater. For this reason, the border E may become, in some cases, a starting point of a fatigue failure of the weld zone 241. It should be noted that FIG. 11 shows only the weld zone 241 and the reinforcement member 242 without illustrating the rear cross member 1.

Figure 12:
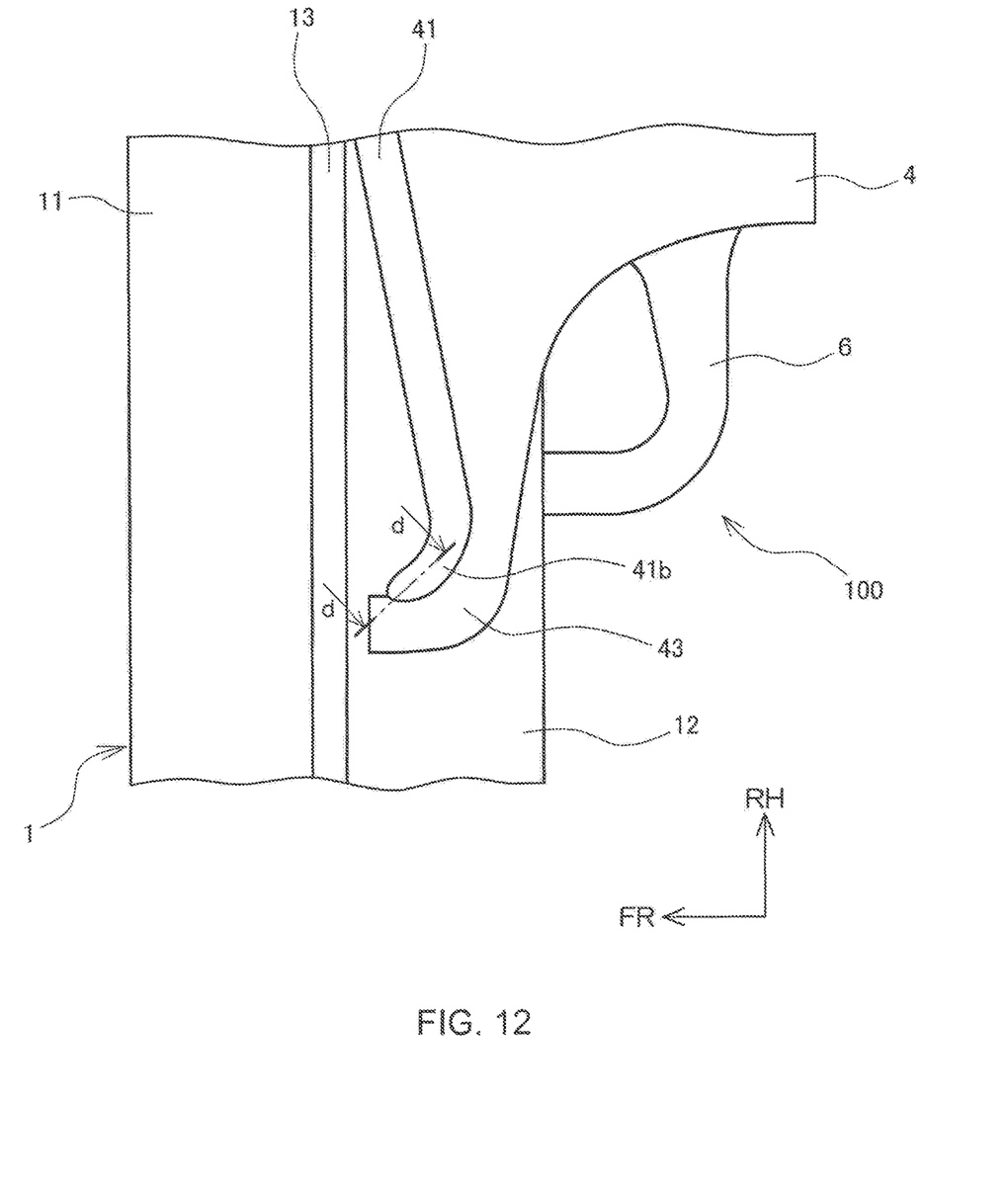
FIG. 12 is a plan view showing a curved end portion of the weld zone between the upper bracket and the rear cross member according to the embodiment.

Next, the reason for a decrease in stress on the curved end portion 41b of the weld zone 41 for joining the upper bracket 4 to the rear cross member 1 in this embodiment will be explained. As shown in FIG. 12, an R portion 43 curved to a vehicle front side is formed on each end region of the upper bracket 4 that is located on either end, in the vehicle width direction, of the upper bracket 4 welded to the rear cross member 1. Then, the curved end portion 41b of the weld zone 41 is formed on an inner side of the R portion 43 of the upper bracket 4. Because a region located within an arc of the R portion 43 has an increased degree of surface stiffness against the principal stresses resulting from the moment load Ma about the lateral axis along the vehicle width direction, stresses on the curved end portion 41b of the weld zone 41 are reduced as compared with the comparative example in which the upper bracket 24 has no R portion 43.

Figure 13:
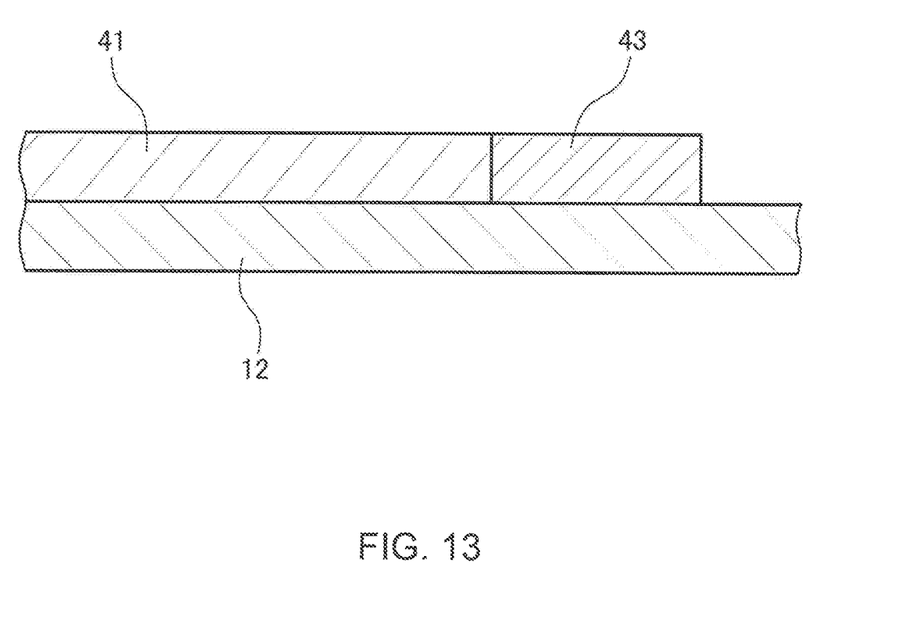
FIG. 13 is a cross section view taken along a line d-d indicated in FIG. 12.

In addition, as shown in FIG. 13, a vehicle-widthwise outer side of the curved end portion 41b of the weld zone 41 is in contact with the R portion 43 of the upper bracket 4. Because of this, in contrast to the outer end of the weld zone 241 in the vehicle width direction in the comparative example, no angle is formed at a border between the upper bracket 4 and the weld zone 41 on the vehicle-widthwise outer side of the curved end portion 41b of the weld zone 41 in this embodiment. In this way, stress concentration, which would be caused by the presence of the angle γ in the comparative example, does not occur at the border between the upper bracket 4 and the weld zone 41 on the vehicle widthwise outer side of the curved end portion 41b of the weld zone 41. As a result, stresses on the curved end portion 41b can become smaller than those in the comparative example.

For the above-described reason, when the curved end portion 41b is formed on the weld zone 41 for joining the upper bracket 4 to the rear cross member 1, the stresses on the curved end portion 41b can be reduced in this embodiment in contrast to the vehicle rear portion structure of the comparative example, which can help prevent a fatigue failure of the weld zone 41.

Figure 14:
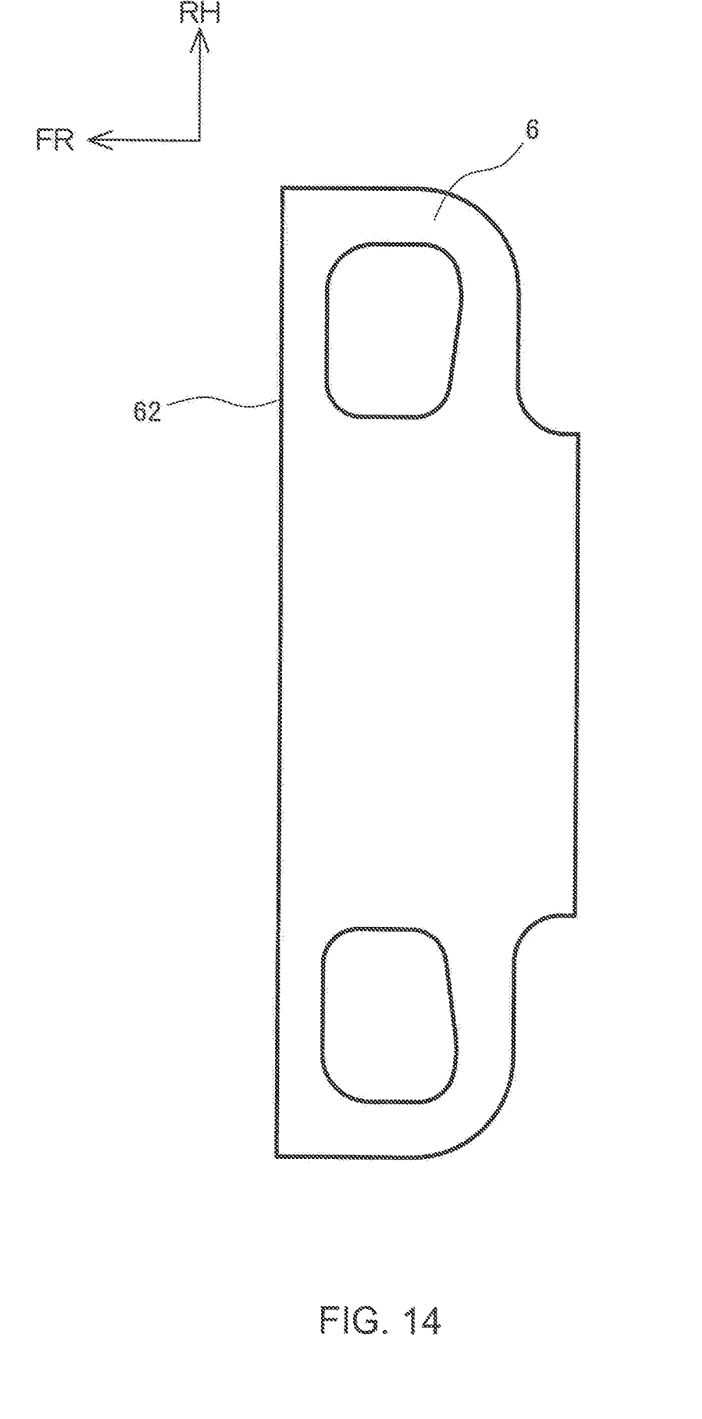
FIG. 14 is a plan view showing a lower bracket according to the embodiment.

Meanwhile, in the present embodiment, a front end 62 of the lower bracket 6 in the vehicle longitudinal direction is welded as described above through the weld zone 61 to the bottom surface 16 of the rear cross member 1. As shown in FIG. 14, because a portion of the lower bracket 6 that forms the front end 62, in the vehicle longitudinal direction, of the lower bracket 6 welded to the bottom surface 16 of the rear cross member 1 is linearly extended, the weld zone 61 for joining the lower bracket 6 to the rear cross member 1 is accordingly formed in a linear shape along the vehicle width direction. Such a linearly extending shape of the weld zone 61 can prevent an increase in manufacturing costs which would be otherwise occur due to a complex shape of the weld zone 61.

The vehicle rear portion structure of this disclosure is not limited to the above-described embodiment, and may be implemented in various forms without departing from the scope of this disclosure. For example, the structure according to the above-described embodiment may be similarly applied to vehicles having a monocoque body instead of the chassis frame, so long as the monocoque body includes the rear cross member 1. The central portion 41a of the weld zone 41 between the rear cross member 1 and the upper bracket 4 may have another shape so long as the central portion 41a is extended along the vehicle width direction in the plan view of the vehicle. Further, the towing tool attachment 3 may be otherwise formed. Moreover, the structure according to the above-described embodiment may be applied to a rear cross member whose plate thickness is increased by a reinforcement member attached to a surface of the rear cross member as in the case of comparative example.

The invention claimed is:

1. A rear portion structure of a vehicle, comprising:
   a rear cross member that is disposed on a rear end region of the vehicle in a vehicle longitudinal direction so as to extend along a vehicle width direction;
   a towing tool attachment that is disposed on a central portion of the rear cross member in the vehicle width direction, and configured to fix a towing tool used for allowing the vehicle to tow a towed object; and
   a bracket that is configured to connect the towing tool attachment to the rear cross member, wherein
   a front end of the bracket in the vehicle longitudinal direction is welded to a top surface or a bottom surface of the rear cross member; and
   a weld zone between the rear cross member and the bracket includes, in a plan view of the vehicle, a central portion extending along the vehicle width direction, and a curved end portion extending in a curved shape from each end of the central portion in the vehicle width direction toward a front side or a diagonally front side of the vehicle.

2. The rear portion structure of a vehicle according to claim 1, wherein a vehicle-widthwise outer side of the curved end portion of the weld zone is in contact with the bracket.

3. The rear portion structure of a vehicle according to claim 1, wherein:

the bracket is an upper bracket whose front end in the vehicle longitudinal direction is welded to the top surface of the rear cross member;

the rear portion structure further comprises a lower bracket configured to connect the towing tool attachment to the rear cross member;

a front end of the lower bracket in the vehicle longitudinal direction is welded to the bottom surface of the rear cross member, and a weld zone between the rear cross member and the lower bracket is linearly extended along the vehicle width direction.

4. The vehicle rear portion structure according to claim 2, wherein:

the bracket is an upper bracket whose front end in the vehicle longitudinal direction is welded to the top surface of the rear cross member;

the rear portion structure further comprises a lower bracket configured to connect the towing tool attachment to the rear cross member;

a front end of the lower bracket in the vehicle longitudinal direction is welded to the bottom surface of the rear cross member, and a weld zone between the rear cross member and the lower bracket is linearly extended along the vehicle width direction.

\* \* \* \* \*